Jan. 13, 1959 W. W. WEBB 2,868,948
METAL ARC WELDING
Filed Jan. 26, 1954

INVENTOR
WATT W. WEBB
BY
Barnwell R. King
ATTORNEY

United States Patent Office 2,868,948
Patented Jan. 13, 1959

2,868,948
METAL ARC WELDING

Watt W. Webb, Boston, Mass., assignor to Union Carbide Corporation, a corporation of New York Application January 26, 1954, Serial No. 406,298

7 Claims. (Cl. 219—73)

This invention relates to metal arc welding and, more particularly, to submerged-melt welding (Jones et al. 2,043,960) although not limited thereto, being also suitable for sigma welding (Muller et al. 2,504,868).

Attempts to utilize high current-density, i. e. 160,000 to 360,000 amperes/square inch electrode cross section, in submerged welding have been made spasmodically for the last twelve years, at least. The arc potential was never more than about 45 volts, and the work-to-contact nozzle spacing was always kept to a minimum value permitted by flux (melt) burden. The welds were not of commercially-acceptable quality. The use of high current-density is desirable, however, since it materially increases the efficiency of the welding operation.

I have increased the arc potential and combined another technique, namely, an inclined leading electrode, with high current-density, and thereby materially improved the quality of the welds obtained, both in the upper range of the current-densities heretofore investigated and in a substantially extended range.

In accordance with my invention, there is provided a metal arc welding process which comprises applying an arc potential of at least 50 volts between the work and a rod guide tube (contact nozzle), the end of which is a substantially spaced distance from the work surface. A fusible metal rod is fed through the tube at a speed of at least 50 feet per minute, as current is supplied at such potential value, so that the current density in the rod is at least 300,000 amperes per square inch, fusing the end of the rod and the adjacent work, and raising the temperature of an elongated end portion of the rod below the tube with the welding current by resistance heating. At the same time, the rod and tube can be moved relatively to the work at a speed of travel of at least 100 inches per minute.

By increasing the spacing of the contact nozzle to a distance of about three inches, for example, from the work, I have discovered that the electrode fusion rate in such case can be increased fivefold with only a relatively small increase in the welding current, by virtue of such resistance heating of the elongated end portion of the rod.

Figure 1:
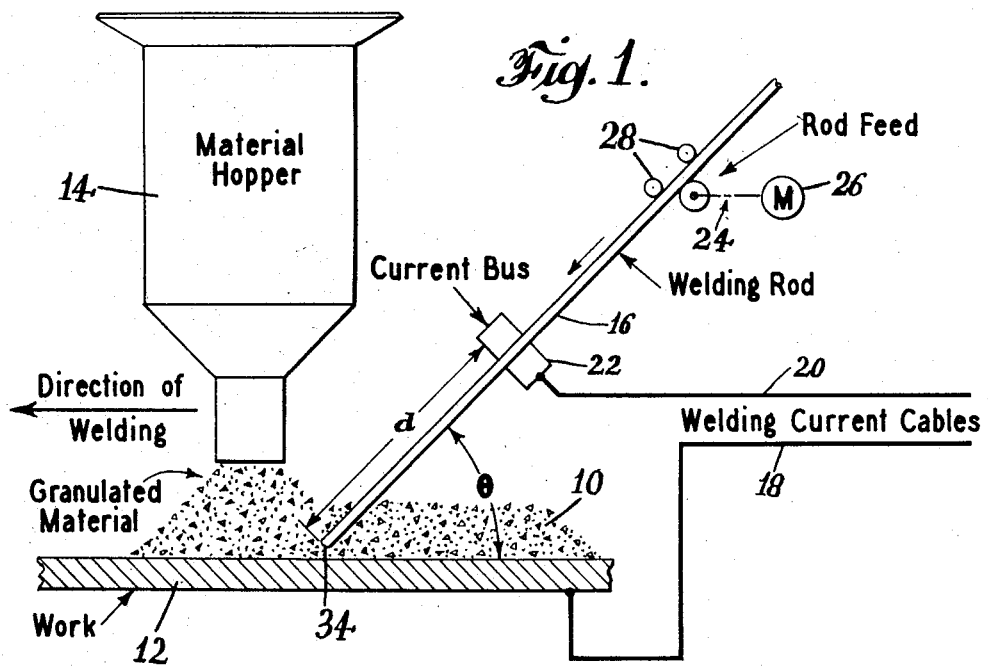
Figure 2:
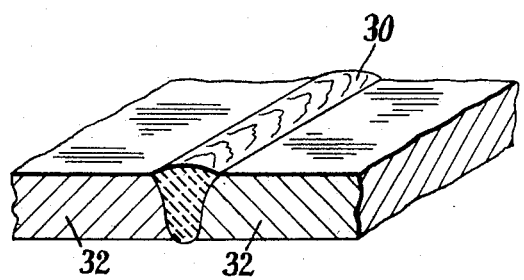

Fig. 1 is a schematic view namely in side elevation of apparatus illustrating the inclined electrode technique of the invention; and Fig. 2 is a perspective view of a butt-weldment made according to the invention with an inclined electrode.

In carrying out the invention, as shown in Fig. 1, a layer 10 of granulated material (flux) is deposited on the work 12 by a material hopper 14 in front of a welding rod (electrode) 16 as the latter is fed continuously toward the work and as the hopper and rod are moved in the direction of welding with respect to the work. Welding current (A. C. or D. C.) is supplied to the rod and work in series through a ground-cable 18 and a head-cable 20, the latter being connected to a current bus in the form of a rod contact tube 22 through which the rod passes on its way to the welding site. The rod is driven by a rod feed 24 comprising a motor 26 and rod-feed rolls 28. The rod is inclined at an angle $\theta$ with respect to the work surface, and the contact tube 22 is spaced a distance $d$ from the end of the rod.

The test work to be described according to the invention includes electrode feed rates up to 215 feet per minute. However, test work was conducted at two more or less discrete levels which I shall call (1) very high current densities, that is, of the order of 300,000 amperes per square inch with about 50 feet per minute of electrode consumption, and (2) ultra-high current densities, that is, of the order of 500,000 amperes per square inch with feed rates of 200 feet per minute. The electrode feed rate depends on the contact nozzle spacing $d$, Fig. 1, as well as current density.

It is very important that the zone of contact between the power supply to the welding head and the electrode itself be confined solely to the region of the lowest section of the contact tubes. Therefore, the contact tubes for most of the distance from the drive knurl to the end contact nozzle should be insulated from the bus bar, and electrical contact obtained only in a tube (beryllium-copper) approximately 1½ inch long at the lower end of the rod contact assembly.

The above discussion applies to the use of $\frac{1}{16}$- and $\frac{1}{32}$-inch diameter electrodes composed of steel. There was very little difficulty at any time when feeding $\frac{1}{16}$-inch diameter electrodes, but the precaution noted above was very necessary for uniformly feeding $\frac{1}{32}$-inch diameter electrodes. It was found that the electrode should be wound on spools and held in a spoke-type reel with very light restraining spring pressures. It was also found that the electrodes should be cold-finished to increase their stiffness. Although it was possible to feed a reel of annealed $\frac{1}{32}$-inch diameter electrodes, these came out of the head throughly bent in an unpredictable fashion so that the path of the welding arc wobbled all over the base plate.

The distinct characteristics of very high and ultra-high current-density welding techniques are rather definite and can be summarized as follows:

(1) Deep penetration occurs at normal voltages (less than 45 volts) and at current densities below 300,000 amperes per square inch. As the current density is increased above 300,000 amperes per square inch, the penetration does not increase much and there is a greater tendency for the weld to become porous and much more ropy in appearance. These results are generally independent of travel speed. However, in accordance with this invention, by raising the arc potential to values above about 50 volts, and the electrode feed rate up to at least 50 feet per minute, it is possible to obtain wide, flat welds with low penetration.

(2) *Electrode fusion rate.*—The coefficient of electrode fusion was found to vary drastically with the particular operating conditions of the present invention in contrast to its usual constant value at normal current densities. Under prior art current densities, the rate of melting of electrodes in pounds per second can be represented by an equation.

$$F = \frac{VI}{H}$$

where $F$=electrode fusion rate, $V$ has a value of 5.3 volts regardless of the actual arc voltage but dependent on the melt composition;

$I$=the welding current amperes;

$H$ = the heat of fusion of the metal including the heat necessary to superheat such metal to puddle temperature. Thus, it is obvious that the factor $$\frac{V}{H}$$

is the coefficient of electrode fusion. In the prior art, this is usually considered for steel to be 0.5 pound per 1000 ampere-minute, or $8.7 \times 10^{-6}$ pounds per ampere-second. The coefficient of electrode fusion appears to be dependent, to some extent, on the operating level of current but not voltage, and on the melt composition.

However, as the current density is increased, the flow of current through the electrode in the region between the contact nozzle and the top of the arc results in a certain amount of resistance heating. The amount of power involved is $I^2R$, where R is the resistance of the electrode in this region. Such resistance depends on three factors: the length $L$, the area $A$, and the temperature of the electrode. The temperature factor appears because the resistivity is dependent on temperature according to the equation $$r = \Sigma r_0 + aT$$

where $r_0$ is the resistivity of the electrode at room temperature;
$r$ is the effective resistance of the extended length of the electrode;
$a$ is the thermal coefficient of resistivity;
$T$ is the rise in temperature.

The $I^2R$ term for resistance heating is obviously in units of power and could be represented by $IE$, where E is the voltage drop in the section of electrode between the contact nozzle and the top of the arc. Actual measurements of such voltage drop confirmed this. Thus, I have obtained a new empirical fusion equation for high current densities to include the electrical resistance term. This becomes $$F = \frac{VI}{H} + \frac{I^2rL}{A}$$

where L is the length of the end portion of the rod.

By raising the contact nozzle to distances of about three inches above the working surface of the base plate, for example, it is possible to increase the electrode fusion rate to at least five times its normal value simply through the resultant increase of the second term of the right-hand side of the above equation. The relationship between current density and the rate at which the electrode is fed depends upon the distance $d$ between the contact nozzle 22 and the top of the arc 34, Fig. 1. This factor has considerable practical significance. As a consequence of such resistance heating, it requires a very small increase of current to result in an increase of electrode consumption rate from 50 to 200 feet per minute.

The definition of the characters in the equation $$F = \frac{VI}{H} + \frac{I^2rL}{A}$$

may be changed to read $F_1 + F_2 = F$, where $$F_1 = \frac{VI}{H}$$

where $F_1$ = the fusion rate resulting from the heat of the arc, and $$F_2 = \frac{I^2rL}{A}$$

where $F_2$ = the fusion rate resulting from the variables expressed on the right-hand side of the equation, that is, the cross sectional area of the rod, the amount of extension of the rod past the contact point, the effect of the resistance of the electrode, etc. The symbol "$r$" in the latter equation is defined above and, as will be noted, corresponds to a set of variables, one of which is "$T$," which represents the rise in temperature. This symbol provides means by which the upper range of the variables expressed in line 1 above may be established by defining the upper limit for "$T$" as the temperature just below that at which fusion would occur. In other words, the current densities employed with respect to the electrode characteristic and the length of the extension may be up to the value where complete and simultaneous fusion of the full length of the extended portion occurs.

The above discussion describes the essential characteristics of high current-density techniques so far as the melting of the electrode and penetration into the base plate was concerned. However, it was also possible to observe some peculiar effects on the flow of weld metal in the weld metal puddle of the welding zone. The effects of current-density on this flow are described with other factors below.

During welding, the form of the welding zone appears to be drastically altered from that which, according to the prior art, normally produced acceptable welds, and a number of observations were made which give some indication of the phenomena occurring in the welding puddle. Some of these are mentioned below.

It was observed that an increase of the current density with constant arc voltage results in a narrowing of the melting path of the arc. The path of the arc can be observed only where the weld metal does not fill the groove cut by the arc or where it is ejected from this groove by arc forces.

There appeared to be an electrodynamic or hydrodynamic force along the axis of the arc. Speculation as to the cause of this force suggests electronic and ionic bombardment simultaneously in the arc or simpler mechanical projection of liquid weld metal across the arc. In addition, the electrode metal has an initial velocity equal to the electrode feed rate which, as was noted, attains the substantial value of 200 feet per minute in some cases.

The effect of this force appears to be to eject the liquid weld metal from the region underneath the electrode. This results in a scouring action on the base plate which further leads to deep penetration. Frequently, when this force is sufficient, examination of craters in the ends of rather small welds showed that the weld metal was being projected as far as 4 or 5 inches behind the electrode.

It appeared that the success of techniques, based on inclining of the electrode to direct this arc force forward, resulted in maintenance of a puddle of molten metal underneath the end of the electrode. This produced shallow pentration and wide, flat welds which were well fused into the base plate on their edges. It was repeatedly observed that intermediate electrode angles between those which produced wide, flat welds and ropy welds resulted in garbled mixtures of melt and metal with ejection of weld metal in all directions, indicating that an unstable borderline case exists and that the electrode angle is critical, i. e. 45° (+5°) for angle $\theta$, Fig. 1.

During travel at ultra-high welding speeds (500 and 1000 inches per minute), it is possible to maintain a continuous arc, with a continuous deposit being produced on the base plate. At 500 inches per minute there was a continuous bead of weld metal deposited, and the path of the arc was nearly twice as wide as the bead weld which was deposited in the shallow groove cut by the arc. The width of the arc path and the deposit can be reduced by the use of smaller diameter electrodes.

When welding with very high or ultra-high current-densities, especially at relatively high travel speeds, it is not possible to operate appreciably below 50 volts without stumbling and shorting of the electrode, but this is a function of the amount of electrode extension beyond contact tip. A drop of 30 volts was used with short extensions at high travel speeds.

The following novel techniques are possible according to this invention:

*Inclined electrode butt-welding technique.*—In this technique, Fig. 1, the electrode is inclined at a plowing or leading angle of about 40-50 degrees, and relatively high currents and high travel speeds are used. Wide, flat, shallow welds are obtained.

*Inclined electrode surfacing technique.*—This technique, Fig. 1, depends on the widening and flattening of welds by inclining the electrode as described above, but in addition, resistance preheating of the electrode is used to increase the amount of electrode metal fused as compared to the amount of base metal fused. No upper limit on the rate of deposition of the electrode using this process has yet been found. Typical welding conditions are 1000 amperes, 70 volts, 30 inches per minute, and a 45 degree electrode angle with 2¼ inches vertical spacing.

Finally, techniques and high-speed (travel) welding of gauge thicknesses of steel in excess of 500 inches per minute are possible.

I claim:

1. Metal arc welding process which comprises applying an arc potential of at least 50 volts between fusible metal work and a rod contact tube the end of which is spaced a substantial distance away from the work surface, feeding a fusible metal rod through said tube toward the work at a speed of at least 50 feet per minute, supplying welding current at such potential so that the current density in such rod is at least 300,000 amperes per square inch, fusing the end of said rod and the adjacent work, and raising the temperature of the portion of the rod between such tube and the end of the rod by resistance heating, the maximum value of such temperature being just below that at which complete and simultaneous fusion of the full length of such portion of the rod occurs.

2. Metal arc welding process as defined by claim 1, in which the rod is inclined at an included angle of lead of 40-50 degrees with repect to the work surface.

3. Metal arc welding process as defined by claim 1, in which the tube to work spacing is at least three inches.

4. Ultra-high current density submerged melt metal arc welding which comprises resistance heating an elongated end portion of a fusible metal electrode in the form of a rod which is fed through a contact nozzle toward a welding arc which is energized by current flowing through such nozzle and such elongated rod end portion at a current density of at least 300,000 amperes per square inch and at a fusion rate which satisfies the formula $$F=\frac{VI}{H}+\frac{I^2rL}{A}$$

in which formula F is the rod fusion rate of melting in pounds per second, V is a value in volts dependent on the melt, I is the welding current in amperes, H is the heat of fusion of the rod metal, r is the effective resistance of the electrode, L is the length of the end portion of the rod in inches and is of the order of at least 3, and A is the cross-sectional area of the rod in square inches; wherein the term $$\frac{I^2rL}{A}$$

contributes the dominant portion of the value of F and has a maximum value just below that at which complete and simultaneous fusion of the full length of such rod end portion occurs.

5. Metal arc welding as defined by claim 4, in which the rod is inclined at an included angle of 40-50 degrees with respect to work thereunder.

6. Metal arc welding which comprises spacing the end of an electrode contact tube at a substantial distance from the work to be welded, feeding a welding electrode of fusible metal through such contact tube toward such work at a relatively rapid rate of at least 50 feet per minute, applying a welding arc potential of relatively high voltage of at least 50 volts between such tube and the work from a suitable source of power, supplying welding current from said source to said tube, electrode and work in series, the value of said welding current being such that the current-density in such electrode is at least 300,000 amperes per square inch of electrode cross-section, which raises the temperature by resistance heating of that portion of said electrode between the arc and the end of said tube as such portion is fed toward such work, increasing the rate of deposition of weld metal supplied by said electrode with and at a rate greater than the increase in the product of square of the current by the length of said electrode portion, the maximum value of such temperature being just below that at which complete and simultaneous fusion of the full length of such portion of the rod occurs.

7. In an electric arc metal deposition process in which metal is deposited onto a fusible metal workpiece by energy liberated from an arc maintained between a fusible metallic electrode and the metal workpiece, while the electrode is fed toward the arc as it is fused; the novel steps comprising supplying to such process electrical energy sufficient to maintain the arc voltage at at least its normal value plus additional energy, in excess of the arc-liberated electrical energy by an amount of the order of the arc-liberated energy; and utilizing such excess electrical energy in internal resistance heating of the electrode to a value such that the electrode temperature, at the arcing end thereof, approaches the melting temperature of the electrode.

References Cited in the file of this patent

UNITED STATES PATENTS

| | | |
|---|---|---|
| 2,315,358 | Smith | Mar. 30, 1943 |
| 2,405,673 | Scherl | Aug. 13, 1946 |
| 2,444,834 | Landis et al. | July 6, 1948 |
| 2,504,868 | Muller et al. | Apr. 18, 1950 |
| 2,692,323 | Meller | Oct. 19, 1954 |
| 2,721,249 | Landis et al. | Oct. 18, 1955 |